(12) United States Patent
Cho et al.

(10) Patent No.: US 8,045,596 B2
(45) Date of Patent: Oct. 25, 2011

(54) APPARATUS AND METHOD FOR TRANSMITTING/RECEIVING A SIGNAL IN A COMMUNICATION SYSTEM

(75) Inventors: Jae-Hee Cho, Seoul (KR); Jin-Kyu Koo, Suwon-si (KR); Jeong-Ho Park, Seoul (KR); Kwan-Hee Roh, Hwaseong-si (KR); Tae-Young Kim, Seongnam-si (KR); Soon-Young Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 932 days.

(21) Appl. No.: 12/026,200

(22) Filed: Feb. 5, 2008

(65) Prior Publication Data

US 2008/0187029 A1    Aug. 7, 2008

(30) Foreign Application Priority Data

Feb. 6, 2007    (KR) .................. 10-2007-0012223

(51) Int. Cl.
*H04B 1/707* (2006.01)
(52) U.S. Cl. ........................................ 375/141
(58) Field of Classification Search .................. 375/141, 375/146, 147
See application file for complete search history.

(56) References Cited

U.S. PATENT DOCUMENTS

| 7,161,895 | B1 | 1/2007 | Sudo |
| 7,746,896 | B2 * | 6/2010 | Venkatachalam ............. 370/468 |
| 2004/0081227 | A1 | 4/2004 | Lim et al. |
| 2004/0100897 | A1 | 5/2004 | Shattil |
| 2005/0226141 | A1 | 10/2005 | Ro et al. |

FOREIGN PATENT DOCUMENTS

| JP | 10233753 A | 9/1998 |
| WO | 2004032371 A1 | 4/2004 |

* cited by examiner

*Primary Examiner* — Kevin Kim
(74) *Attorney, Agent, or Firm* — Jefferson IP Law, LLP (57) ABSTRACT

An apparatus for transmitting/receiving a signal in a communication system is provided. A Mobile Station (MS) spreads a transmission signal to generate a spreading signal, receives, from a Base Station (BS), information on a second spreading signal transmission region, extended from a first spreading signal transmission region, and maps the generated spreading signal to a subcarrier in the second spreading signal transmission region. A Base Station (BS) transmits information on a second spreading signal transmission region extended from a first spreading signal transmission region, for reception of a spreading signal, receives a spreading signal mapped to subcarriers over the second spreading signal transmission region, from an Mobile Station (MS), detects a spreading signal from the spread signal mapped to the subcarriers, and despreads the detected spreading signal to restore a transmission signal.

36 Claims, 6 Drawing Sheets

FIG.1

(CONVENTIONAL ART)

APPARATUS AND METHOD FOR TRANSMITTING/RECEIVING A SIGNAL IN A COMMUNICATION SYSTEM

PRIORITY

This application claims the benefit under 35 U.S.C. §119 (a) of a Korean patent application filed in the Korean Intellectual Property Office on Feb. 6, 2007 and assigned Serial No. 2007-12223, the entire disclosure of which is hereby incorporated by reference.

BACKGROUND OF THE INVENTION

1. Field of the Invention

The present invention relates generally to a communication system. More particularly, the present invention relates to an apparatus and method for transmitting/receiving an uplink spreading signal in a communication system.

2. Description of the Related Art

Current communication systems transmit/receive signals using, for example, Orthogonal Frequency Division Multiplexing (OFDM) and/or Orthogonal Frequency Division Multiple Access (OFDMA). In addition, the communication systems use, for example, Adaptive Modulation and Coding (AMC), Hybrid Automatic Repeat Request (HARQ), multi-antenna, etc. taking into account a high-speed service supporting capability, a bandwidth utilization efficiency, etc.

The communication system includes a transmitter and a receiver, for example, a Mobile Station (MS) and a Base Station (BS), for transmitting/receiving signals. A description will now be given of a signal transmission from the MS to the BS. A signal transmitted from the MS includes control information being fed back to the BS. The control information is information which is fed back from the MS to the BS due to the application of AMC, HARQ, multi-antenna, etc. and includes, for example, Channel Quality Information (CQI), Acknowledgement/Non-Acknowledgement (ACK/NACK), Multiple Input Multiple Output (MIMO) mode switching information, etc.

The MS spreads the control information with a spreading code to generate a spreading signal (or spread signal), and transmits the generated spreading signal to the BS. Therefore, MSs of the communication system can transmit control information to the BS using the spreading code.

To this end, the communication system reserves uplink signal transmission resources for the transmission of the spreading signal. The MSs transmit their generated spreading signals to the BS over the reserved resource region. A description will now be made of a spreading signal transmission region reserved for the transmission of control information, i.e., spreading signal, in uplink resources of the communication system.

Figure 1:
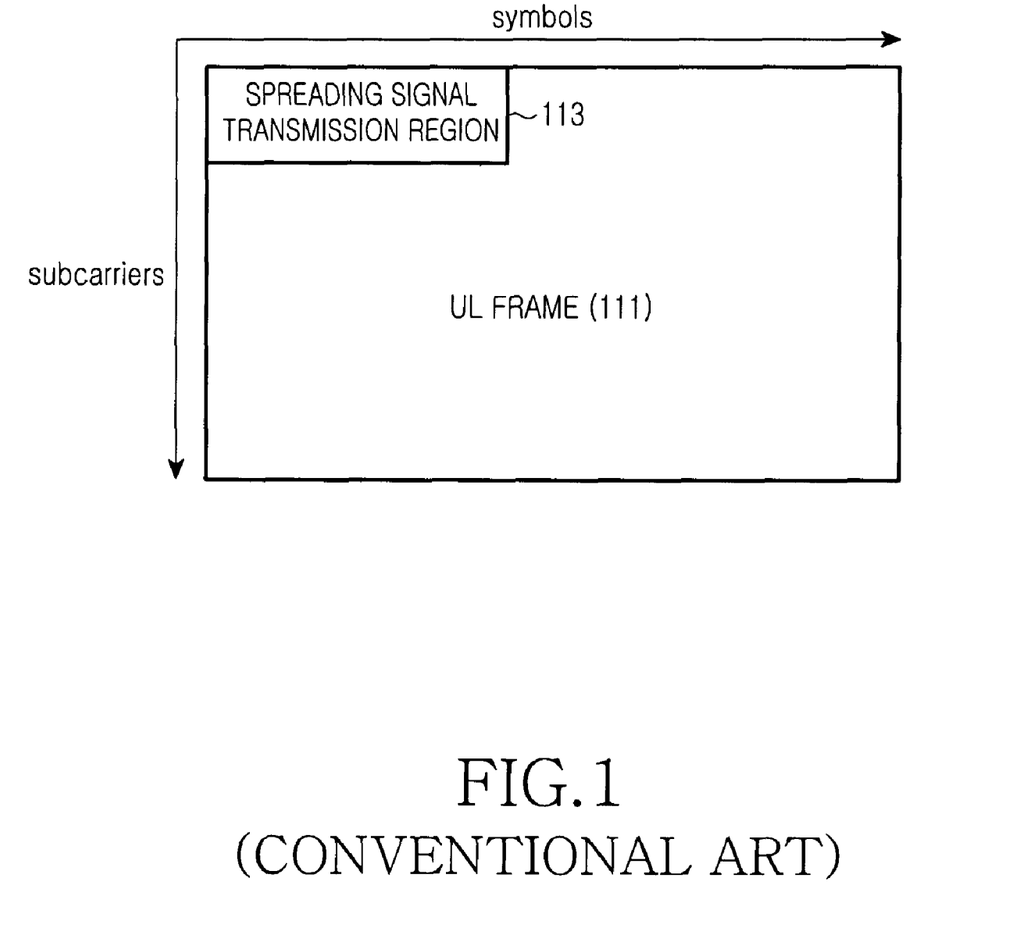
FIG. 1 illustrates an uplink frame including a spreading signal transmission region in a conventional communication system.

FIG. 1 illustrates an uplink frame including a spreading signal transmission region in a conventional communication system.

Referring to FIG. 1, an uplink (UL) frame 111 includes a spreading signal transmission region 113 for transmission of control information that MSs each feed back to a BS. Herein, the control information is a spreading signal which is spread with a spreading code.

The uplink frame 111, as illustrated in the drawing, includes a plurality of symbols and a plurality of subcarriers. Therefore, the MS can transmit a control signal such as the Channel Quality Information (CQI), Acknowledgement/Non-Acknowledgement (ACK/NACK), and Multiple Input Multiple Output (MIMO) mode switching information over the spreading signal transmission region 113.

In the communication system, an index of an MS is assumed herein to be 'i'. A spreading signal corresponding to the feedback information that an MS #i transmits to the BS is defined herein as $C_{i,n}$, where n denotes a value between 0 and N−1. For generation of the spreading signal, the MS performs Binary Phase Shift Keying (BPSK) modulation on a spreading code with an N-subcarrier length.

The spreading signal transmission region 113 includes N subcarriers. The parameter N is a multiple of the minimum uplink resource allocation unit $N_{alloc}$, and $N_{alloc}$ has various values greater than '1' for each communication system. If the N subcarriers are defined as $S_n$, n has a value between 1 and N−1. The N subcarriers can be adjacent to each other or distributed over the full band according to the resource structure of the uplink frame.

The signals $S_n$ that MSs transmit over the spreading signal transmission region 113 can be expressed as $S_n = C_{i,n}$.

Assume that the number of MSs transmitting uplink feedback information is I and that the MSs each transmit one spreading signal. In this case, if uplink power control is performed in the ideal channel environment, signals received at the BS are expressed as Equation (1).

$$S_n = \sum_{i=0}^{I-1} C_{i,n} \tag{1}$$

The maximum number of spreading signals transmittable through the signal $S_n$ should be limited such that the BS receiving the spreading signals can detect each spreading code at a specific error rate through despreading. Since the despreading process and an operation of finding a detection probability depart from the scope of the present invention, a detailed description thereof will be omitted herein for simplicity.

However, it is possible to set the maximum number $I_{max}$ of spreading signals separately for each communication system. Therefore, in the case where the communication system satisfies $S_n = C_{i,n}$ (where n=0~N−1), if the number of spreading signals corresponding to the uplink control information is assumed to be I, the amount of subcarrier resources to be allocated in the spreading signal transmission region 113 is expressed as Equation (2).

$$\lceil I/I_{max} \rceil \times N \tag{2}$$

In Equation (2), $\lceil x \rceil$ denotes the minimum integer greater than x.

Figure 2:
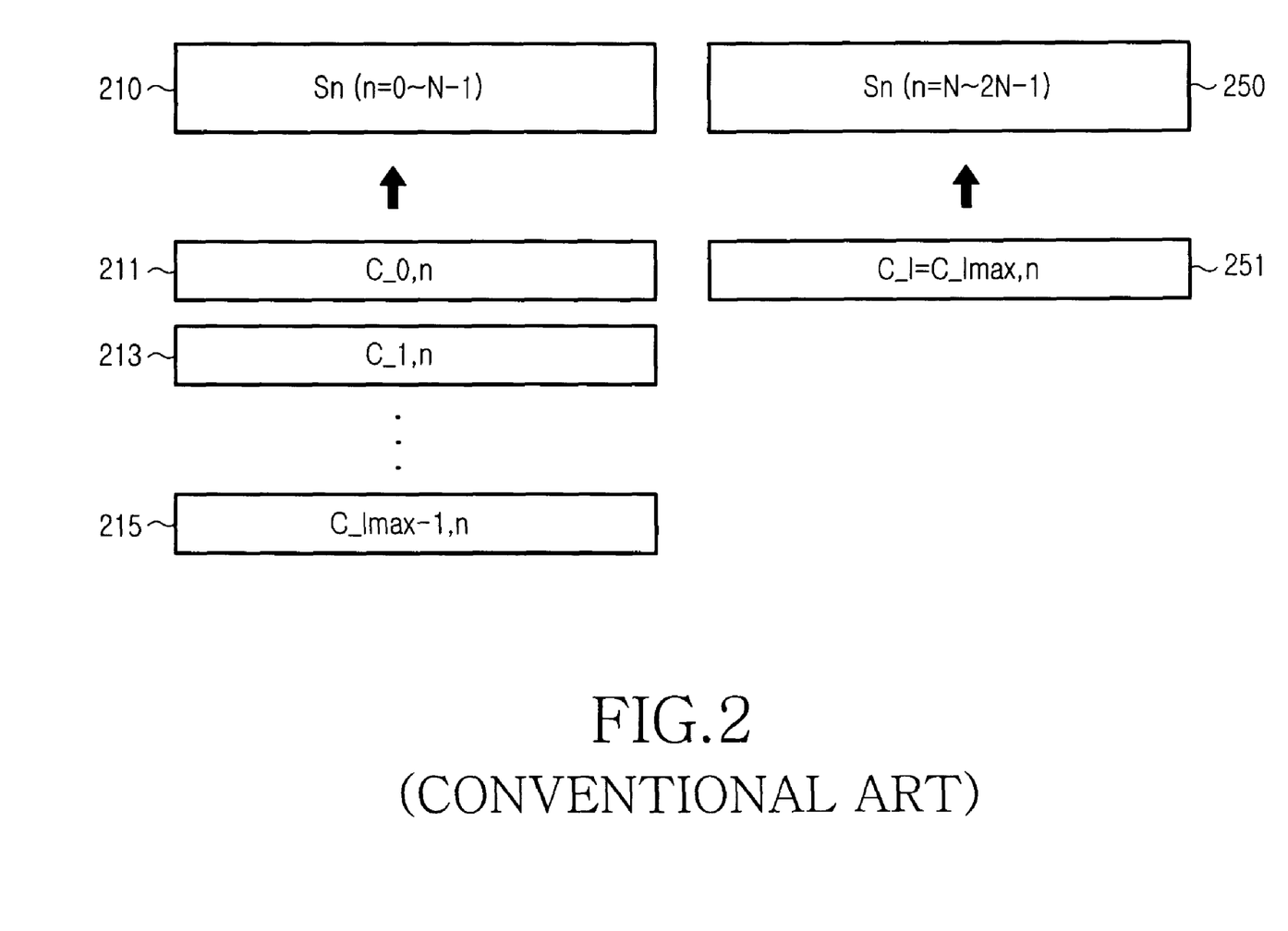
FIG. 2 illustrates a spreading signal transmission region for the transmission of control information in a conventional communication system.

With reference to FIG. 2, a description will now be given of a spreading signal transmission region that results from increasing the amount of resources.

FIG. 2 illustrates a spreading signal transmission region for the transmission of control information in a conventional communication system.

Referring to FIG. 2, MSs use a first spreading signal transmission region 210 and a second spreading signal transmission region 250, for the transmission of control information. A BS receives the spreading signal from MSs over the first spreading signal transmission region 210 and the second spreading signal transmission region 250.

When using the first spreading signal transmission region 210, MSs each transmit a maximum of $I_{max}$ spreading signals. When the number of spreading signals included in one spreading signal transmission region exceeds a specific threshold, it is impossible for the BS to receive the spreading signal(s) that exceeds the threshold in number. Therefore, the number of spreading signals that MSs can transmit over one spreading signal transmission region is previously determined.

Assume that a signal $S_n$ is transmitted over the first spreading signal transmission region 210 and that the signal $S_n$ includes N subcarriers. $I_{max}$ signals 211, 213 and 215 transmitted over the first spreading signal transmission region 210 are shown.

Assume that the number of spreading signals that MSs will transmit to the BS is $I_{max}+1$. In this case, because it has exceeded the maximum number of spreading signals transmittable over one spreading signal transmission region in an uplink frame, the BS should additionally use another spreading signal transmission region, i.e., the second spreading signal transmission region 250, for transmission of the exceeding spreading signal, i.e., one spreading signal 251.

Like this, even though the number of spreading signals that exceeds the maximum number $I_{max}$ of spreading signals is only one, there is a need for a separate second spreading signal transmission region 250 which is equal in size to the first spreading signal transmission region 210. As a result, in order to transmit the $I_{max}+1$ spreading signals, there is a need for 2N subcarriers, assuming that the number of resources, i.e., subcarriers, of each spreading signal transmission region is N.

Therefore, for the transmission of the spreading signals, where there is a number of spreading signals which exceed the maximum number of spreading signals to be transmitted over one spreading signal transmission region with a preset size, it is necessary to additionally use a separate spreading signal transmission region. In other words, there is a need to use a spreading signal transmission region with a preset size regardless of the number of the exceeding spreading signals, causing a waste of resources.

SUMMARY OF THE INVENTION

An aspect of the present invention is to address at least the above-mentioned problems and/or disadvantages and to provide at least the advantages described below. Accordingly, an aspect of the present invention is to provide an apparatus and method for transmitting/receiving a signal in a communication system.

Another aspect of the present invention is to provide a signal transmission/reception apparatus and method in which a spreading signal transmission region with a fixed size is extended in a communication system.

Further, another aspect of the present invention is to provide a signal transmission/reception apparatus and method for linearly extending the size of a spreading signal transmission region according to a spreading signal transmission in a communication system.

According to one aspect of the present invention, a method for transmitting a signal by a Mobile Station (MS) in a communication system is provided. The method includes spreading a transmission signal to generate a spreading signal, receiving, from a Base Station (BS), information on a second spreading signal transmission region, extended from a first spreading signal transmission region, mapping the generated spreading signal to a subcarrier in the second spreading signal transmission region, and transmitting the mapped spreading signal.

According to another aspect of the present invention, a method for receiving a signal by a Base Station (BS) in a communication system is provided. The method includes transmitting information on a second spreading signal transmission region extended from a first spreading mapped to subcarriers signal transmission region, for reception of a spreading signal, receiving a spreading signal over the second spreading signal transmission region from an Mobile Station (MS), detecting a spreading signal from the spread signal mapped to the subcarrriers, and despreading the detected spreading signal to restore a transmission signal.

According to further another aspect of the present invention, an apparatus for transmitting a signal in a communication system is provided. The apparatus includes a Mobile Station (MS) for spreading a transmission signal to generate a spreading signal, receiving, from a Base Station (BS), information on a second spreading signal transmission region, extended from a first spreading signal transmission region, mapping the generated spreading signal to a subcarrier in the second spreading signal transmission region, and transmitting the mapped spreading signal.

According to yet another aspect of the present invention, an apparatus for receiving a signal in a communication system is provided. The apparatus includes a Base Station (BS) for transmitting, information on a second spreading signal transmission region extended from a first spreading signal transmission region, for reception of a spreading signal, for receiving a spreading signal mapped to subcarriers over the second spreading signal transmission region, for detecting a spreading signal from the spreading signal mapped to the subcarriers, and for despreading the detected spreading signal to restore a transmission signal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following detailed description when taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an apparatus and method for transmitting/receiving spreading signals between a transmitter and a receiver in a communication system. According to exemplary embodiments of the present invention, the transmitter transmits desired transmission spreading signals to the receiver by circular-shifting the spreading signals at intervals of a preset circular shift unit. The transmitter transmits spreading signals over a spreading signal transmission region which is linearly extended according to the number of spreading signals.

For convenience, the transmitter and the receiver will be assumed to be a Mobile Station (MS) and a Base Station (BS), respectively. However, it is not intended to limit the transmitter and the receiver to be an MS and a BS.

Therefore, according to exemplary embodiments of the present invention, the common resources used for the transmission of spreading signals increases with the number of uplink feedback signals, i.e., spreading signals, that the transmitter desires to transmit.

According to exemplary embodiments of the present invention described below, it is assumed that an MS transmits spreading signals using a spreading signal transmission region in which subcarriers are included, the number of which is proportional to the number I of spreading signals. The number of subcarriers included in the spreading signal transmission region is defined herein as N'. In addition, according to exemplary embodiments of the present invention, the MS can circular-shift the spreading signals by a multiple of a preset specific value d, and then map them to the subcarriers. Therefore, d indicates a circular shift unit, at intervals of which the spreading signals are circular-shifted.

The MSs and the BS transmit/receive spreading signals over the spreading signal transmission region (hereinafter referred to as a 'reference spreading signal transmission region') which has been previously set for the transmission of spreading signals, separately for each communication system, before it is extended. If the number of spreading signals the MS will transmit exceeds the maximum number of spreading signals transmittable over the reference spreading signal transmission region, a size of the reference spreading signal transmission region will be linearly extended. The extended reference spreading signal transmission region is a spreading signal transmission region proposed by the exemplary embodiments of the present invention (hereinafter referred to as an 'extended spreading signal transmission region'). Therefore, the extended spreading signal transmission region is defined as a expended region used for including transmitting spreading signals, the number of which exceeds the maximum number of spreading signals transmittable over the reference spreading signal transmission region into spreading signal transmission region and transmitting the spreading signals.

Figure 3:
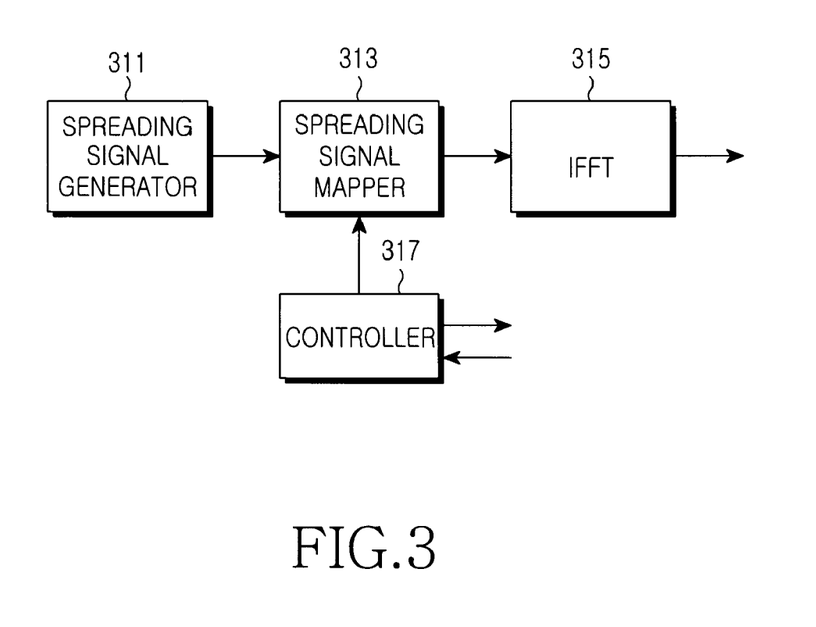
FIG. 3 illustrates a structure of an MS for transmitting a spreading signal in a communication system according to an exemplary embodiment of the present invention.

FIG. 3 illustrates a structure of an MS for transmitting a spreading signal in a communication system according to an exemplary embodiment of the present invention.

Referring to FIG. 3, an MS includes a spreading signal generator 311, a spreading signal mapper 313, an Inverse Fast Fourier Transform (IFFT) unit 315, and a controller 317.

The spreading signal generator 311 generates a spreading signal by spreading a transmission signal with a spreading code. The transmission signal includes, for example, a control signal that an MS transmits to a BS. The control signal includes, for example, Channel Quality Information (CQI), Multiple Input Multiple Output (MIMO) mode switching information, Acknowledgement/Non-Acknowledgement (ACK/NACK) message, etc. The control signal is a feedback signal which is fed back over an uplink.

A communication system that transmits/receives the spreading signal is assumed to use, for example, Orthogonal Frequency Division Multiplexing (OFDM) and/or Orthogonal Frequency Division Multiple Access (OFDMA).

The minimum uplink resource allocation unit of the communication system is denoted by $N_{alloc}$, and the maximum number of spreading signals transmittable over a reference spreading signal transmission region is denoted by $I_{max}$. The number of subcarriers included in an uplink spreading signal transmission region over which the $I_{max}$ spreading signals can be transmitted is denoted by N. The number N of subcarriers is a multiple of $N_{alloc}$.

The reference spreading signal transmission region is included in an uplink frame. The number of subcarriers needed to transmit I spreading signals is assumed herein to be N'. The number N' of subcarriers is expressed as Equation (3).

$$N' = \begin{cases} N & I \le I_{max} \\ \lceil N \times I / I_{max} \rceil^{N_{alloc}} & I > I_{max} \end{cases} \quad (3)$$

where N' denotes the number of subcarriers included in an extended spreading signal transmission region, N denotes the number of subcarriers included in a non-extended reference spreading signal transmission region, I denotes the number of currently transmitted spreading signals, and $\lceil x \rceil^M$ denotes a minimum positive integer being a multiple of a M from among positive integers greater than x (where M is an integer).

Herein, $\lceil x \rceil^M$ means the minimum value greater than x among the numbers which are a multiple of M (where M is an integer). For example, when x=11.2 and M=5, $\lceil 11.2 \rceil^5$=15. A circular shift unit d, at intervals of which the spreading signals are circular-shifted as described above, is expressed as Equation (4).

$$d = \lceil N'/I \rceil \quad (4)$$

where N' denotes the number of subcarriers included in a spreading signal transmission region over which I spreading signals will be transmitted, and I denotes the number of spreading signals for MSs, to be transmitted over the extended spreading signal transmission region. When N'=N and I<$I_{max}$, the MS can avoid circular shifting by determining the circular shift unit d as '0'. Alternatively, the MS can allow the circular shift unit d to have a value less than the number of spreading signals by defining the circular shift unit d as $\lceil N'/(I/F) \rceil$ (where F is an integer greater than 0).

The controller 317 receives values of N' and d from a controller of the BS that receives the spreading signal, and outputs the received values to the spreading signal mapper 313. The values N' and/or d being output to the spreading signal mapper 313 is converted into a format of a Medium Access Control (MAC) message by the controller 317.

The controller 317 can exchange spreading signal control parameters for the transmission of the spreading signals, with the controller of the BS. The spreading signal control parameters are parameters used for exchanging spreading signals between the MS and the BS. Therefore, the MS maps the spreading signals using the parameters, and transmits the mapped spreading signal to the BS, and the BS orders the spreading signals transmitted from the MS using the parameters, and restores the ordered spreading signals. The parameters for transmission/reception of spreading signals include, for example, an index of the MS, information on the number of subcarriers included in the spreading signal transmission region, information on the circular shift unit for transmission of the spreading signals, etc.

The controller 317 circular-shifts the spreading signal by a multiple of the circular shift unit on the basis of a start point of the extended spreading signal transmission region according to an index of the MS, and maps the circular-shifted spreading signal to the subcarrier. For example, when an index i of the MS is 1, the controller 317 circular-shifts the spreading signal by the circular shift unit d. When an index of the MS is 2, the controller 317 circular-shifts the spreading signal by 2d which is two times the circular shift unit d. When an index of the MS is 3, the controller 317 circular-shifts the spreading signal by 3d which is three times the circular shift unit d. The circular-shifted spreading signals are mapped to the subcarriers to be included in the extended spreading signal transmission region. When the circular shift unit d, like $\lceil N'/(I/F) \rceil$, has a value less than an index of the MS, it is possible to circular-shift spreading signals of different MSs (i.e., spreading signals corresponding to respective indexes of different the MSs) with the same circular shift unit.

The spreading signal mapper 313 receives the MAC message. The spreading signal mapper 313 maps the spreading signal to the subcarrier to be included in the spreading signal transmission region under the control of the controller 317.

An index of the MS is i. A signal $S_{n'}$ (where n'=0~N'-1) included in a spreading signal transmission region of an uplink frame for the MS, is expressed as Equation (5).

$$S_{n'} = C_{i,n_i}$$

$$n_i = f_i(n') \quad (5)$$

In $n_i=f_i(n')$ of Equation (5), $n_i$ and n' indicate a function satisfying one-to-one mapping. In this case, for n>N−1, $C_{i,n}=0$. An example of $n_i=f_i(n')$ is shown in Equation (6).

$$n_i = (n'-i*d) \bmod N' \quad (6)$$

The spreading signal mapper 313, under the control of the controller 317, circular-shifts the spreading signal with a multiple of circular shift unit d shown in Equation (4), and maps the circular-shifted spreading signal to the subcarrier in the extended spreading signal transmission region. When the number of spreading signals to be transmitted over a reference spreading signal transmission region exceeds the number of spreading signals that can be accommodated in the reference spreading signal transmission region, an extended spreading signal transmission region can be used that has linearly increased (extended) according to the number of the exceeding spreading signals. Therefore, there is no further need for a separate reference spreading signal transmission region for transmission of the exceeding spreading signals.

The IFFT unit 315 IFFT-transforms the spreading signal mapped to the subcarrier to generate an OFDM signal, and then transmits the OFDM signal to the BS via an antenna.

Figure 4:
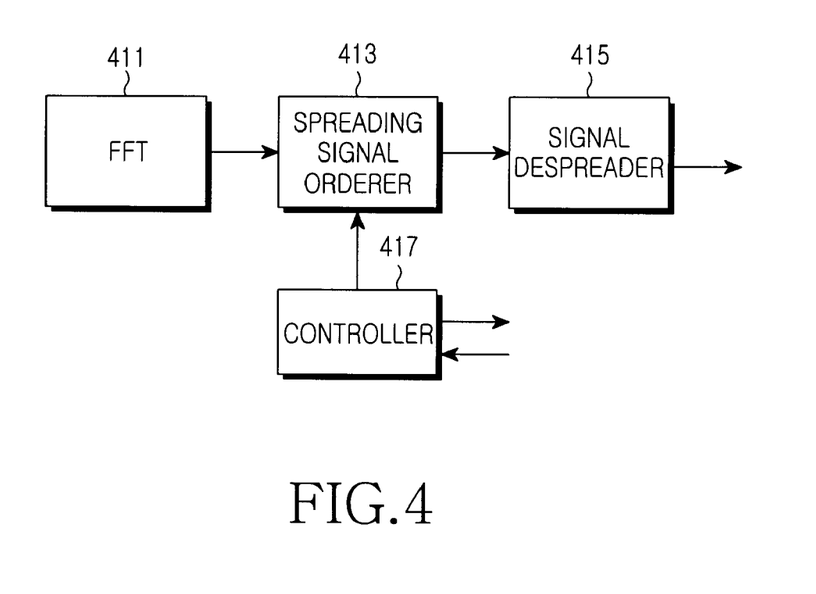
FIG. 4 illustrates a structure of a BS for receiving a spreading signal in a communication system according to an exemplary embodiment of the present invention.

With reference to FIG. 4, a description will now be made of an operation of a BS for receiving the transmission signal transmitted by the MS.

FIG. 4 illustrates a structure of a BS for receiving a spreading signal in a communication system according to an exemplary embodiment of the present invention.

Referring to FIG. 4, a BS includes a Fast Fourier Transform (FFT) unit 411, a spreading signal orderer 413, a signal despreader 415, and a controller 417.

The FFT unit 411 receives an OFDM signal transmitted by the MS via a receive antenna or the like, and the FFT-transforms the received OFDM signal. The FFT unit 411 detects subcarriers of an extended spreading signal transmission region from the modulated subcarrier signal, and outputs the detected subcarriers to the spreading signal orderer 413.

The spreading signal orderer 413 orders spreading signals included in the subcarriers by inverse circular shifting. The inverse circular shifting for the spreading signal is a scheme of ordering spreading signals by inverse circular shifting using the circular shift unit that the MS has used for circular shifting. The spreading signal orderer 413, when it has circular-shifted the circular shift unit by a multiple of an MS index using an index of the MS, can reorder the spreading signals by using the index of the MS in addition to the circular shift unit.

The signal the BS receives includes I spreading signals. Assuming that ideal uplink power control is performed in the ideal channel environment, the signal the BS receives is expressed as Equation (7).

$$S_{n'} = \sum_{i=0}^{I-1} C_{i,n_i} \quad (7)$$

where $n_i$ and n' indicate a one-to-one mapping function. In this case, for n>N−1, $C_{i,n}=0$. Since the parameters of Equation (7) have been described in detail in Equation (5), a detailed description thereof will be omitted herein for simplicity.

The spreading signal orderer 413 can acquire from the received signal the spreading signals $\tilde{C}_{i,n}$ that the MSs transmitted. The acquired signal $\tilde{C}_{i,n}$ is expressed as Equation (8).

$$\tilde{C}_{i,n} = S_{n'}$$

$$n' = f_i^{-1}(n) \quad (8)$$

In Equation (8), $n'=f_i^{-1}(n)$ is an inverse function of $n_i=f_i(n)$. For example, for $n_i=(n'-i*d) \bmod N'$ for circular-shifting the spreading code, an inverse function $n'=f_i^{-1}(n)$ is $n'=(n'+i*d) \bmod N'$. The spreading signal orderer 413 outputs the ordered signal $\tilde{C}_{i,n}$ to the signal despreader 415.

The spreading signal orderer 413 orders spreading signals using the circular shift unit d that the MSs have used for circular-shifting the spreading signals.

The controller 417 can generate an index i of the MS that transmits the spreading signal. The controller 417 transmits the generated indexes of the MSs to their associated MSs. The controller 417 orders the indexes of the MSs, for example, Medium Access Control Connection Identifiers (MAC CIDs) of the MSs that will transmit spreading signals, in ascending or descending order, and can determine the indexes of the MSs in the order of the ordering result.

When, for example, I spreading signals are transmitted, the controller 417 can generate or determine the number N' of subcarriers included in the spreading signal transmission region, and generates a circular shift unit used for circular-shifting the spreading signals and transmits the generated circular shift unit to each MS. The parameters generated by the controller of the BS can be transmitted to the controller in each of the MSs.

The controller 417 outputs the generated parameters N' and d to the spreading signal orderer 413. The controller 417 controls the spreading signal orderer 413 to order the spreading signals received from the FFT unit 411. The controller 417 converts the parameters N' and/or d being output to the spreading signal orderer 413 into the format of a MAC message.

The signal despreader 415 despreads the spreading signals output from the spreading signal orderer 413 to thereby restore the signals that each MS has transmitted. For despreading of the spreading signals, the signal despreader 415 can use spreading codes, and it uses the same spreading codes as those used by the MSs. For example, the spreading codes can be separately stored in the BS and the MSs. In an alternative manner, the spreading codes can be transmitted/received over a separate message, or can be transmitted/received along with the parameters exchanged between the BS and the MSs.

The foregoing description of an exemplary embodiment of the present invention is directed to an exemplary case where the BS generates parameters for transmission/reception of spreading signals, and transmits them to each of the MSs. On the contrary, however, exemplary embodiments of the present invention can also be applied to an alternative case where the controller of the MS generates the parameters for transmission/reception of spreading signals, and transmits them to the BS. The foregoing parameters are given herein by way of example, and they may include all parameters that should be exchanged between the BS and the MSs for transmission/reception of the spreading signals.

Figure 5:
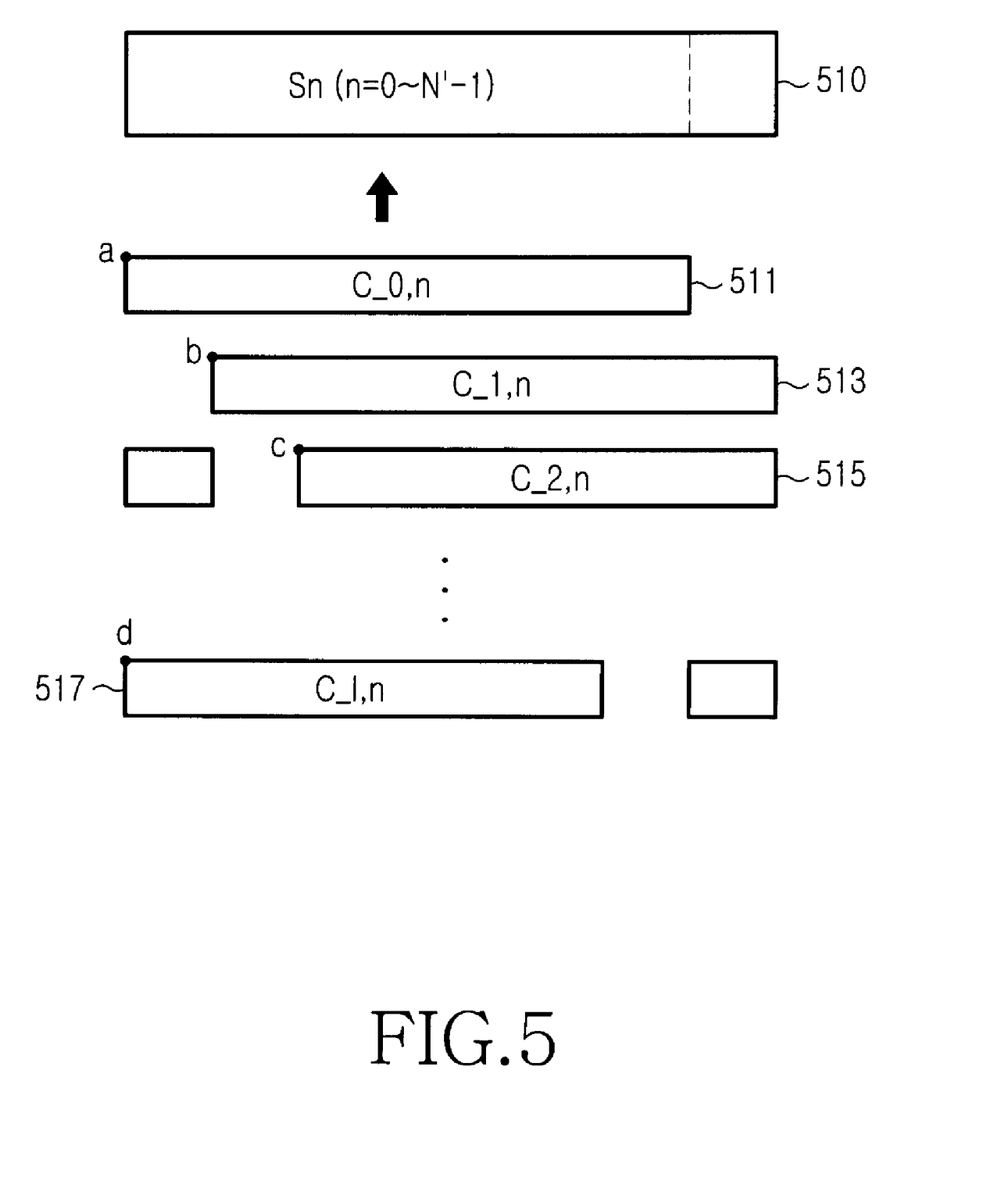
FIG. 5 illustrates a spreading signal transmission region for transmission/reception of spreading signals in a communication system according to an exemplary embodiment of the present invention.

FIG. 5 illustrates a spreading signal transmission region for the transmission/reception of spreading signals in a communication system according to an exemplary embodiment of the present invention.

Referring to FIG. 5, an extended spreading signal transmission region 510 includes spreading signals 511, 513, 515 and 517. Also, the extended spreading signal transmission region 510 includes N' subcarriers.

The extended spreading signal transmission region 510 is used for transmitting the spreading signal(s), the number of which exceeds a size of a reference spreading signal transmission region.

When the number of desired transmission spreading signals exceeds the maximum number of spreading signals transmittable over the reference spreading signal transmission region, the MSs transmit the exceeding spreading signals over the extended spreading signal transmission region 510. Then the BS receives the spreading signals over the extended spreading signal transmission region 510.

Multiple spreading signals 511, 513, 515 and 517 included in the extended spreading signal transmission region 510 are circular-shifted in positions a, b, c and d at intervals of a circular shift unit. Therefore, the MSs circular-shift spreading signals at intervals of the circular shift unit, and map them to subcarriers in the extended spreading signal transmission region 510.

In the communication system according to an exemplary embodiment of the present invention, the BS and the MSs flexibly extend the reference spreading signal transmission region according to an increase in the number of spreading signals, and transmit spreading signals over the extended spreading signal transmission region. Therefore, there is no need for an additional reference spreading signal transmission region, thereby facilitating efficient resource utilization.

Figure 6:
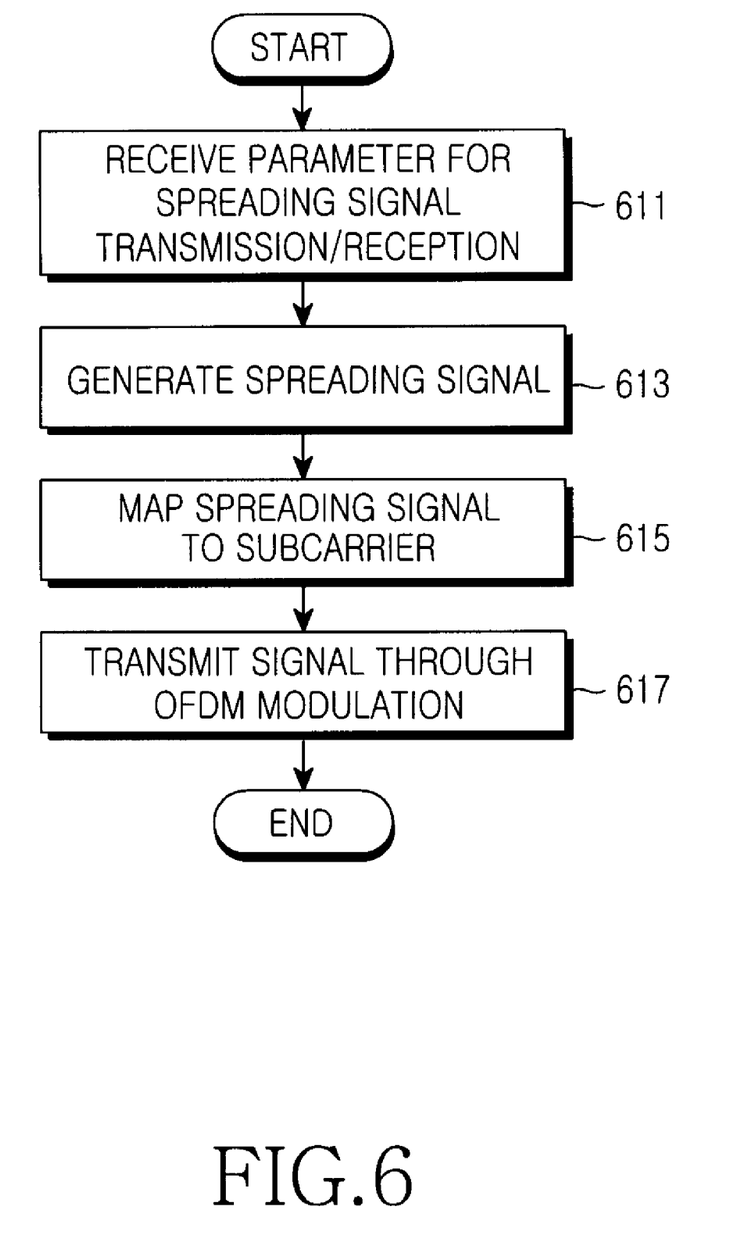
FIG. 6 illustrates an operation of an MS for transmitting spreading signals according to an exemplary embodiment of the present invention.

With reference to FIG. 6, a description will now be made of an operation of the MS for transmitting spreading signals.

FIG. 6 illustrates an operation of an MS for transmitting spreading signals according to an exemplary embodiment of the present invention.

Referring to FIG. 6, in step 611, the MS receives one or more parameters for the transmission/reception of spreading signals, and then proceeds to step 613. With use of the parameters for the transmission/reception of spreading signals, the MS can spread a transmission signal, map the spread spreading signal to subcarriers included in a spreading signal transmission region, and transmit the resultant spreading signal to a BS. The parameters include information on at least one of a reference spreading signal transmission region and a spreading signal transmission region that the MS will use for the transmission of spreading signals. The MS determines a spreading signal transmission region over which it will transmit the spreading signal, by checking the region information, and transmits the spreading signal over the determined spreading signal transmission region.

In step 613, the MS generates a spreading signal by spreading a control signal that the MS desires to transmit, and then proceeds to step 615. The control signal can be, for example, a signal that the MS intends to feed back to the BS, and the control signal includes CQI, MIMO mode switching information, ACK/NACK message, etc. In generating a spreading signal, the MS generates the spreading signal by spreading the control signal with a spreading code.

In step 615, the MS maps the generated spreading signal to a subcarrier in the spreading signal transmission region, and then proceeds to step 617. In mapping a spreading signal to a subcarrier in the spreading signal transmission region, the MS circular-shifts the spreading signal according to a preset circular shift unit and maps it to the subcarrier. When necessary, the MS can map the spreading signal to the subcarrier without performing circular shifting thereon.

If the MS cannot transmit spreading signals over the reference spreading signal transmission region which is established to transmit spreading signals transmitted from MSs, the MS extends the reference spreading signal transmission region and transmits the spreading signals over the extended spreading signal transmission region.

Therefore, when there are spreading signals, the number of which exceeds the maximum number of spreading signals transmittable over the reference spreading signal transmission region as a result of an increase in the number of spreading signals the MSs will transmit, a size of the reference spreading signal transmission region can be extended, and then the spreading signals can be transmitted over the extended spreading signal transmission region. The size of the extended spreading signal transmission region is variable according to the number of spreading signals, and can have a variable value according to system conditions and/or user settings.

When mapping the spreading signal to the subcarrier in the spreading signal transmission region separately or uniquely for each MS, the spreading signal can be circular-shifted by a multiple of a unique circular shift unit for each MS separately for every MS, and maps the circular-shifted spreading signal to the subcarrier.

In step 617, the MS OFDM-modulates the spreading signal mapped to the subcarriers in the reference spreading signal transmission region or the extended spreading signal transmission region, and transmits the modulated spreading signal. The OFDM modulation includes, for example, an IFFT transform or the like.

Figure 7:
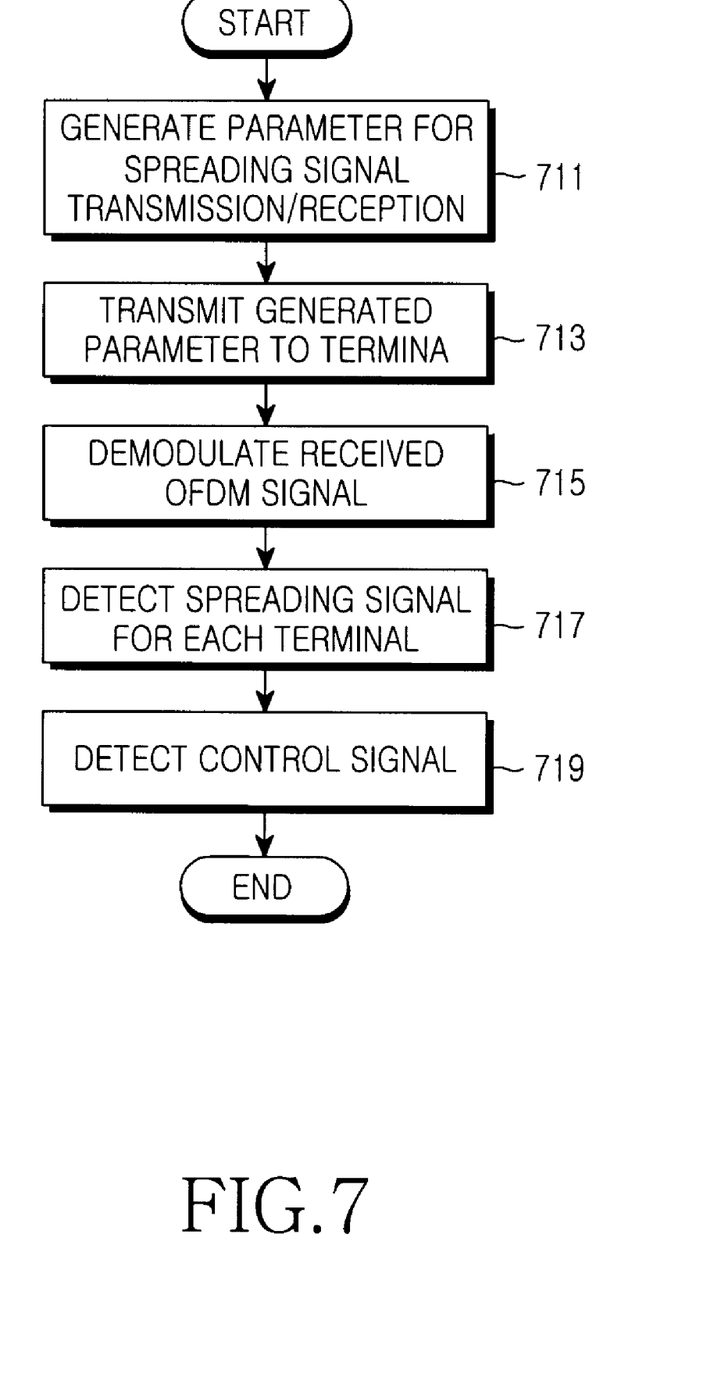
FIG. 7 illustrates an operation of a BS for receiving a spreading signal according to an exemplary embodiment of the present invention.

With reference to FIG. 7, a description will now be made of an operation of a BS for receiving a spreading signal.

FIG. 7 illustrates an operation of a BS for receiving a spreading signal according to an exemplary embodiment of the present invention.

Referring to FIG. 7, in step 711, the BS generates one or more parameters for the transmission/reception of spreading signals, and then proceeds to step 713.

In step 713, the BS transmits one or more generated parameters to an MS. When the BS cannot transmit the spreading signals to be received at the MS, over a preset reference spreading signal transmission region, the BS extends the reference spreading signal transmission region. After extending the reference spreading signal transmission region, the BS communicates with the MSs using the extended spreading signal transmission region. The BS determines over which of the reference spreading signal transmission region and the extended spreading signal transmission region the MSs will transmit the spreading signals, and transmits, depending on the determination result, information on, i.e., one or more parameters for, a selected one of the reference spreading signal transmission region and the extended spreading signal transmission region to the corresponding MSs, to allow the MSs to transmit the spreading signals thereon.

In step 715, the BS demodulates a received OFDM signal using the control signal in the selected one of the reference spreading signal transmission region and the extended spreading signal transmission region, and then proceeds to step 717.

In step 717, the BS detects a spreading signal for each MS, and then proceeds to step 719. For the spreading signals included in the subcarriers, when spreading positions of spreading codes are circular-shifted separately for MSs, the BS shares the circular shift information for the spreading signals with the MSs, and detects the spreading signals using the circular shift information.

In step 719, the BS despreads the spread spreading signals to restore the transmission information or control information, transmitted by each MS.

As is apparent from the foregoing description, according to exemplary embodiments of the present invention, the MS transmits the spreading signals to the BS over the extended spreading signal transmission region. Therefore, the communication system can extend the spreading signal transmission region having a fixed size and transmit the spreading signals over the extended spreading signal transmission region, thereby avoiding the possible need for an additional spreading signal transmission region. In addition, the BS and the MS can extend the fixed size spreading signal transmission region used for the transmission of spreading signals, and transmit/receive the spreading signals over the extended spreading signal transmission region.

While the invention has been shown and described with reference to a certain exemplary embodiment thereof, it will be understood by those skilled in the art that various changes in form and details may be made therein without departing from the spirit and scope of the invention as defined by the appended claims and their equivalents.

What is claimed is:

1. A method for transmitting a signal by a Mobile Station (MS) in a communication system, the method comprising:
   spreading a transmission signal to generate a spreading signal;
   receiving, from a Base Station (BS), information on a second spreading signal transmission region, extended from a first spreading signal transmission region;
   mapping the generated spreading signal to a subcarrier in the second spreading signal transmission region; and
   transmitting the mapped spreading signal.

2. The method of claim 1, wherein the transmission signal comprises at least one of channel quality information, mode switching information, and an Acknowledgement/Non-Acknowledgement (ACK/NACK) message.

3. The method of claim 1, wherein the first spreading signal transmission region is a spreading signal transmission region set in the system, and the second spreading signal transmission region is defined as an extended spreading signal transmission region used for including transmitting spreading signals, and
   wherein the number of the spreading signals exceeds the maximum number of spreading signals transmittable over the first spreading signal transmission region.

4. The method of claim 3, wherein mapping the spreading signal to a subcarrier comprises:
   circular-shifting the spreading signal within the second spreading signal transmission region according to a circular shift unit, and mapping the circular-shifted spreading signal to the subcarrier.

5. The method of claim 4, wherein the number of subcarriers is determined by using the following equation;

$$N' = \begin{cases} N & I \leq I_{max} \\ \lceil N \times I / I_{max} \rceil^{N_{alloc}} & I < I_{max} \end{cases}$$

where N denotes the number of subcarriers included in the first spreading signal transmission region, I denotes the number of currently transmitted spreading signals, $I_{max}$ denotes the maximum number of spreading signals transmittable over the first spreading signal transmission region, $N_{alloc}$ denotes a minimum resource allocation unit of the communication system, and $\lceil x \rceil^M$ denotes a minimum positive integer being a multiple of a M from among positive integers greater than x, where M is an integer.

6. The method of claim 5, wherein the circular shift unit is a spaced distance (d) between spreading signals included in the second spreading signal transmission region, and is calculated by one of the following equations;

$$d = \lceil N'/I \rceil \text{ and } d = \lceil N'/(I/F) \rceil$$

where F denotes an integer greater than 0.

7. The method of claim 3, wherein mapping the spreading signal to the subcarrier comprises:
   receiving an index of the MS and the circular shift unit from the BS; and
   circular-shifting the spreading signal by a multiple of the MS index on a basis of the circular shift unit.

8. The method of claim 1, wherein the information on the second spreading signal transmission region comprises information on the number of subcarriers included in the second spreading signal transmission region.

9. A method for receiving a signal by a Base Station (BS) in a communication system, the method comprising:
   transmitting, information on a second spreading signal transmission region extended from a first spreading signal transmission region, for reception of a spreading signal;
   receiving the spreading signal mapped to subcarriers over the second spreading signal transmission region form from an Mobile Station (MS);
   detecting the spreading signal from the received spreading signal mapped to the subcarriers; and despreading the detected spreading signal to restore a transmission signal.

10. The method of claim 9, wherein the transmission signal comprises at least one of channel quality information, mode switching information, and an Acknowledgement/Non-Acknowledgement (ACK/NACK) message.

11. The method of claim 9, wherein the first spreading signal transmission region comprises a spreading signal transmission region set in the system, and the second spreading signal transmission region is defined as an extended spreading signal transmission region used for transmitting spreading signals, and
   wherein the number of which the spreading signals exceeds the maximum number of spreading signals transmittable over the first spreading signal transmission region.

12. The method of claim 11, wherein the detecting of the spreading signal comprises:
   inverse-circular-shifting the spreading signal mapped to the subcarriers using a circular shift unit; and
   detecting the spreading signal from the received spreading signals mapped to the subcarriers ordered by performing the inverse circular shifting.

13. The method of claim 12, wherein the number of subcarriers is determined by the following equation;

$$N' = \begin{cases} N & I \leq I_{max} \\ \lceil N \times I / I_{max} \rceil^{N_{alloc}} & I > I_{max} \end{cases}$$

where N denotes the number of subcarriers included in the first spreading signal transmission region, I denotes the number of currently transmitted spreading signals, $I_{max}$ denotes the maximum number of spreading signals transmittable over the first spreading signal transmission region, $N_{alloc}$ denotes a minimum resource allocation unit of the communication system, and $\lceil x \rceil^M$ denotes a minimum positive integer being a multiple of a M from among positive integers greater than x, where M is an integer.

14. The method of claim 13, wherein the circular shift unit is a spaced distance (d) between spreading signals included in the second spreading signal transmission region, and is calculated by defined as one of the following equations;

$$d = \lceil N'/I \rceil \text{ and } d = \lceil N'/(I/F) \rceil$$

where F denotes an integer greater than 0.

15. The method of claim 14, wherein inverse-circular-shifting the spreading signal comprises:
   inverse-circular-shifting the spreading signal by a multiple of an index of each MS on basis of the circular shift unit.

16. The method of claim 15, further comprising:
   transmitting the circular shift unit and the MS index to the MS.

17. The method of claim 9, wherein the information on the second spreading signal transmission region comprises information on the number of subcarriers included in the second spreading signal transmission region.

18. An apparatus for transmitting a signal in a communication system, the apparatus comprising:
   a Mobile Station (MS) for spreading a transmission signal to generate a spreading signal, receiving, from a Base Station (BS), information on a second spreading signal transmission region, extended from a first spreading signal transmission region, for mapping the generated spreading signal to a subcarrier in the second spreading signal transmission region, and for transmitting the mapped spreading signal.

19. The apparatus of claim 18, wherein the transmission signal comprises at least one of channel quality information, mode switching information, and an Acknowledgement/Non-Acknowledgement (ACK/NACK) message.

20. The apparatus of claim 18, wherein the first spreading signal transmission region comprises a spreading signal transmission region set in the system, and the second spreading signal transmission region is defined as an extended spreading signal transmission region used for transmitting spreading signals, and
   wherein the number of the spreading signals exceeds the maximum number of spreading signals transmittable over the first spreading signal transmission region.

21. The apparatus of claim 20, wherein the number of subcarriers is determined by the following equation;

$$N' = \begin{cases} N & I \leq I_{max} \\ \lceil N \times I / I_{max} \rceil^{N_{alloc}} & I > I_{max} \end{cases}$$

where N denotes the number of subcarriers included in the first spreading signal transmission region, I denotes the number of currently transmitted spreading signals, $I_{max}$ denotes the maximum number of spreading signals transmittable over the first spreading signal transmission region, $N_{alloc}$ denotes a minimum resource allocation unit of the communication system, and $\lceil x \rceil^M$ denotes a minimum positive integer being a multiple of a M from among positive integers greater than x, where M is an integer.

22. The apparatus of claim 21, wherein to map the spreading signal to a subcarrier, the MS circular-shifts the spreading signal within the second spreading signal transmission region according to a circular shift unit, and maps the circular-shifted spreading signal to the subcarrier.

23. The apparatus of claim 22, wherein the circular shift unit is a spaced distance (d) between spreading signals included in the second spreading signal transmission region, and is calculated by one of the following equations;

$$d = \lceil N'/I \rceil \text{ and } d = \lceil N'/(I/F) \rceil$$

where F denotes an integer greater than 0.

24. The apparatus of claim 20, wherein to circular-shift the spreading signal, the MS receives an index of the MS and the circular shift unit from the BS, and circular-shifts the spreading signal by a multiple of the MS index on basis of the circular shift unit.

25. The apparatus of claim 18, wherein the information on the second spreading signal transmission region comprises information on the number of subcarriers included in the second spreading signal transmission region.

26. The apparatus of claim 18, wherein the MS comprises:
   a spreading signal generator for generating the spreading signal;
   a spreading signal mapper for mapping the spreading signal to a subcarrier in the second spreading signal transmission region;
   an Inverse Fast Fourier Transform (IFFT) unit for IFFT-transforming the spreading signal mapped to the subcarrier, and for transmitting IFFT-transformed spreading signal to the BS; and a controller for controlling the mapping of the spreading signal to a subcarrier in the second spreading signal transmission region and the transmitting of the mapped spreading signal.

27. An apparatus for receiving a signal in a communication system, the apparatus comprising:
a Base Station (BS) for transmitting information on a second spreading signal transmission region extended from a first spreading signal transmission region, for reception of a spreading signal, for receiving the spreading signal mapped to subcarriers over the second spreading signal transmission region, for detecting the spreading signal from the received spreading signal mapped to the subcarriers, and for despreading the detected spreading signal to restore a transmission signal.

28. The apparatus of claim 27, wherein the transmission signal comprises at least one of channel quality information, mode switching information, and an Acknowledgement/Non-Acknowledgement (ACK/NACK) message.

29. The apparatus of claim 27, wherein the first spreading signal transmission region comprises a spreading signal transmission region set in the system, and the second spreading signal transmission region is defined as an extended spreading signal transmission region used for transmitting spreading signals, and
wherein the number of the spreading signals exceeds the maximum number of spreading signals transmittable over the first spreading signal transmission region.

30. The apparatus of claim 29, wherein the number of subcarriers is determined by the following equation;

$$N' = \begin{cases} N & I \leq I_{\max} \\ \lceil N \times I / I_{\max} \rceil^{N_{alloc}} & I > I_{\max} \end{cases}$$

where N denotes the number of subcarriers included in the first spreading signal transmission region, I denotes the number of currently transmitted spreading signals, $I_{max}$ denotes the maximum number of spreading signals transmittable over the first spreading signal transmission region, $N_{alloc}$ denotes a minimum resource allocation unit of the communication system, and $\lceil x \rceil^M$ denotes a minimum positive integer being a multiple of a M from among positive integers greater than x, where M is an integer.

31. The apparatus of claim 30, wherein to detect the spreading signal included in the subcarrier, the BS inverse-circular-shifts the spreading signal mapped to the received subcarriers using a circular shift unit, and detects the spreading signal from the received spreading signals mapped to the subcarriers ordered by performing the inverse circular shifting.

32. The apparatus of claim 31, wherein the circular shift unit is a spaced distance (d) between spreading signals included in the second spreading signal transmission region, and is calculated by one of the following equations;

$$d=\lceil N'/I \rceil \text{ and } d=\lceil N'/(I/F) \rceil$$

where F denotes an integer greater than 0.

33. The apparatus of claim 32, wherein the BS inverse-circular-shifts the spreading signal by a multiple of an index of each MS on a basis of the circular shift unit.

34. The apparatus of claim 33, wherein the BS transmits the circular shift unit and the MS index to the MS.

35. The apparatus of claim 34, wherein the information on the second spreading signal transmission region comprises information on the number of subcarriers included in the second spreading signal transmission region.

36. The apparatus of claim 27, wherein the BS comprises:
a Fast Fourier Transform (FFT) unit for FFT-transforming a received signal, and for detecting the spreading signal mapped to the subcarriers from the second spreading signal transmission region;
a spreading signal orderer for ordering the spreading signal mapped to the subcarriers by performing the inverse circular shifting and detecting a spreading signal from the spreading signals mapped to the ordered subcarriers;
a signal despreader for despreading the detected spreading signal to detect the transmission signal; and
a controller for performing a control for detecting a spreading signal.

* * * * *